3,267,123
REFINING OF THIOCRESOL ISOMERS
Peter P. Croitoru, Bethel Park, Pa., assignor to Consolidation Coal Company, Pittsburgh, Pa., a corporation of Pennsylvania
No Drawing. Filed May 1, 1963, Ser. No. 277,110
11 Claims. (Cl. 260—455)

This invention relates to the refining of mixtures. Specifically, it relates to the separation and recovery of individual thiocresol isomers from a mixture containing orthothiocresol in admixture with at least another thiocresol isomer. More particularly, it relates to the recovery of individual thiocresol isomers in high purity and in high yield by a novel acylation-deacylation process. The initial mixture may contain orthothiocresol and at least another thiocresol isomer in the form of thiocresols or as the acyl thioesters.

Commercial quantities of mixed thiocresols (toluenethiols), containing ortho-, meta-, and parathiocresols, are available as by-products of the refining of cresylic acid-thiophenol mixtures derived from the caustic washing of gasoline. In marked contrast with their cresol or xylene analogs, the three thiocresol isomers boil at essentially the same temperature, precluding their separation by high efficiency fractional distillation. Fractional crystallization techniques are not of interest because typical thiocresol mixtures contain the highest melting isomer, parathiocresol (M.P. 43–44° C.), in lowest concentration. Therefore, an impractically large number of freezing and thawing stages would be required.

In United States Patent 3,084,199, a process is shown for separating thiocresol isomers by a selective alkylation process followed by ring dealkylation and sulfide cleavage. The present invention provides different, novel, and in certain aspects, simpler and more convenient means for separating a commercial mixture of thiocresols into their individual isomers.

Accordingly, it is an object of the present invention to refine mixtures of thiocresols, containing at least orthothiocresol, or their acyl esters.

It is another object to separate an ester of orthothiocresol when in admixture with an ester of at least another thiocresol isomer.

It is a further object to provide a method for recovering othothiocresol in admixture with at least another thiocresol isomer.

It is still another object to provide a method of separating ortho- and metathiocresols from each other.

It is yet another object to provide a method for separating ortho- and parathiocresols.

In its broadest aspects, the process of this invention is applicable to separating the individual components of an initial mixture containing orthothiocresol or its ester and at least another thiocresol isomer or its ester. In a first aspect of this invention, the initial mixture contains the thiocresol isomers as such. In a second aspect, the components of a mixture containing the acyl esters of the thiocresol isomers are separated. During the course of the process, such as in the recycle of thiocresols not completely esterified, various mixtures of thiocresol isomers and their esters may be present.

In accordance with the specific aspects of this invention, orthothiocresol and at least another thiocresol isomer in admixture are converted to their acyl esters by reaction with a halide or anhydride of a lower aliphatic monocarboxylic acid, e.g., R—COX or (RCO)$_2$O, where R has from one to four carbon atoms and is preferably methyl, ethyl, propyl, or butyl, and X is preferably a chlorine atom. Particularly preferred as reactant is acetic anhydride.

The acyl esters of the individual thiocresol isomers present are then separated by fine fractional distillation. The ester of orthothiocresol is readily separated from any of the esters of the other thiocresol isomers initially present. Where all three isomers are initially present, the remaining esters of the isomers of meta- and parathiocresols may then be partially or substantially separated from each other by repeated fractional distillation. The separated esters are then deacylated to recover the corresponding thiocresol isomers.

The present invention is principally directed to recovering orthiocresol from admixture with either meta- or parathiocresol, or, more commonly, from a mixture of the mixed thiocresols as ordinarily obtainable. As shown in United States Patent 3,084,197, the t-alkyl sulfide of parathiocresol may be separated by fine fractionation from the t-alkyl sulfides of ortho- and metathiocresols. The latter pair of sulfides are not separable from each other by fine distillation. Somewhat surprisingly, the distillation behavior of the acyl esters of the three thiocresol isomers is different. Thus it has now been found that it is the acyl ester of orthothiocresol that may be separated by fine fractionation from the acyl esters of meta- and parathiocresols. The latter pair may be concentrated and separated only after repeated fractional distillation.

The process of this invention is particularly applicable to the recovery of othothiocresol from mixed thiocresols obtained from the fractionation of crude aromatic mercaptans, a by-product of the refining of crude cresylic acids, as shown, for example, in United States Patent 2,767,220. Approximately half of the distillate obtained from the fractionation of the aromatic mercaptans consists of thiocresols, which, after treatment for the removal of tar acid contaminants, typically contain an isomer distribution by weight of 35–40 percent ortho-, 43–58 percent meta-, and 15–17 percent para-.

Esterification reactions are well known, and the conventional procedures employed by the art have been found to produce satisfactory esterification results. Under typical reaction conditions, the esters are prepared by reacting an amount of the thiocresol isomers, preferably at reflux temperatures, with at least an equimolar amount of the acyl halide or acyl anhydride of a lower aliphatic monocarboxylic acid. Preferably a $C_2$–$C_5$ anhydride is used, such as acetic, propionic, n-butyric or n-valeric anhydride. Conveniently, for ease in subsequent separation, a relatively low-boiling anhydride is preferred. Because of its lower boiling point, ready availability, and low cost, acetic anhydride would be preferred, and ordinarily would be used commercially, the other anhydrides being less advantageous in this regard. By use of an organic base, e.g., triethylamine, as an acceptor for the excess acid present, the esterification reaction may be rendered more complete and may be conveniently performed at room temperature.

The mixture of thiocresol esters is readily recovered and contains, in order of increasing boiling point, the esters of ortho-, meta-, and parathiocresols. The boiling points of the mixed thiocresols and of the individual acetate esters of the thiocresols, at various pressures, is shown in the following table.

BOILING POINTS OF THIOCRESOLS AND THEIR ACETATE ESTERS, ° C.

|  | 20 mm. Hg | 50 mm. Hg | 100 mm. Hg | 200 mm. Hg | 760 mm. Hg |
|---|---|---|---|---|---|
| Thiocresols | | 108 | 125 | 143 | 194 |
| o-Thiocresol Acetate | 130.0 | 153.5 | 172.5 | 195 | |
| m-Thiocresol Acetate | 133.5 | 158.0 | 177.0 | 200 | |
| p-Thiocresol Acetate | 134.5 | 159.5 | 179 | 201 | |

As may be noted from the table, at 50 mm. Hg pressure, the acetate ester of orthothiocresol boils at 153.5° C., that of metathiocresol at 158° C., and that of parathiocresol at 159.5° C. Thus, the ester of orthothiocresol is readily recovered by fine fractional distillation using a column having at least 20 and preferably about 50 to 75 theoretical plates. The esters of meta- and para-thiocresols may be concentrated and separated from one another by repeated fractionation. The recovered esters may then be readily hydrolyzed by conventional treatment with acid, e.g., dilute sulfuric acid, or base, e.g., dilute sodium hydroxide, to regenerate the respective thiocresol isomers.

The following examples illustrate this invention, but are not to be construed as limitations thereof.

EXAMPLE 1

*Preparation of thiocresol acetate*

Thiocresol acetate was obtained by refluxing 0.248 mole (30.762 g.) of a thiocresol mixture of 97.70 percent purity with 0.326 mole (33.173 g.) of acetic anhydride (mole ratio of thiocresol to acetic anhydride: 1:1.32) at a temperature of 139° C. for a period of 2 hours and 20 minutes. The converted product was then distilled on a fractionating column and the fractions were analyzed by gas-liquid chromatography. The reaction was essentially quantitative, 98.3 percent by weight of the thiocresol being converted in a yield of 97.8 percent.

EXAMPLE 2

*Preparation of thiocresol acetate at room temperature*

A mixture of 25.5417 g. thiocresol (.205 mole), 26.8829 g. acetic anhydride (.263 mole), and 17.1436 g. triethylamine (.169 mole) (mole ratio of thiocresol to acetic anhydride to triethylamine: 1:1.28:.82) was reacted at room temperature for 15 minutes. After reaction, 30 cc. of benzene were added, and the mixture was washed with four 50-cc. portions of water. After removal of the water and additional washing with benzene, the thiocresol acetate was recovered in a conversion yield of 99.3 percent by weight.

EXAMPLE 3

*Preparation of thiocresol n-butyrate*

A sample of 2.70 g. (0.022 mole) of thiocresol of 97.70 percent purity was refluxed at a temperature of 168° C. with 6.20 (0.039 mole) of butyric anhydride (mole ratio of thiocresol to butyric anhydride: 1:1.77), for one hour. The final mixture was analyzed on a gas-liquid chromatograph, with a conversion of thiocresol to thiocresol butyrates of 65 percent being found.

EXAMPLE 4

*Fractionation of thiocresol acetates*

A thiocresol acetate mixture was prepared by esterifying a mixture of thiocresol isomers of known isomer composition with acetic anhydride under reflux conditions as described for Example 1. A charge of 327.0 g. of this thiocresol acetate mixture consisting of 22.5 percent o-thiocresol acetate, 63.7 percent m-thiocresol acetate, and 13.8 percent p-thiocresol acetate was fractionated on a 25 theoretical plate packed column. The distillation results obtained were as follows:

| Fraction Cut No. | Analysis of Cut in Percent | | | Grams per Cut | Weight Percent | Head Temperature, °C. at 50 mm. Hg |
|---|---|---|---|---|---|---|
| | o- | m- | p- | | | |
| 1 | 0.0 | 0.0 | 0.0 | 67.6 | 20.67 | 47.0 flat to 50° C. |
| 2 | 0.0 | 0.0 | 0.0 | 60.3 | 18.44 | 55-66 flat-130° C. |
| 3 | 99.1 | 0.9 | 0.0 | 2.9 | 0.90 | 143-152.5. |
| 4 | 98.2 | 1.8 | 0.0 | 30.1 | 9.20 | 152.5-154.5. |
| 5 | 82.0 | 15.1 | 2.9 | 31.1 | 9.51 | 154.0-156.0. |
| 6 | 32.6 | 57.4 | 10.0 | 20.6 | 6.30 | 157.5-158.0. |
| 7 | 4.5 | 75.0 | 20.5 | 30.6 | 9.36 | 157.0-159.0 (48 mm. Hg). |
| 8 | 0.2 | 59.8 | 39.9 | 20.4 | 6.24 | 159.0. |
| 9 | 0.0 | 22.8 | 77.2 | 60.2 | 18.41 | 159.0. |
| Holdup loss | | | | 3.2 | 0.98 | |
| Total weight | | | | 327.0 | | |

Out of 22.5 percent by weight of o-thiocresol acetate charged, 9.9 percent of essentially pure (98.5% purity) orthothiocresol acetate was recovered in cut nos. 3 and 4, or 44.2% of the total o-thiocresol acetate charged.

EXAMPLE 5

*Hydrolysis of ester to recover thiocresol*

A sample of m-thiocresol of 97 percent purity was converted to its acetate ester by reacting the m-thiocresol with acetic anhydride at a reflux temperature of about 140° C. as shown for Example 1. The m-thiocresol acetate formed was distilled to remove excess acetic anhydride as well as acetic acid formed during the reaction. A distillate cut of relatively pure m-thiocresol acetate (24.5 g.) was acidified with dilute sulfuric acid (approximately 4 N) and was brought to boil. Alcoholic KOH was gradually added over a period of an hour until the solution was neutral to litmus. The recovered mixture was washed with successive portions of distilled water to remove the sodium acetate, the m-thiocresol being recovered as the water-insoluble phase in a yield of 14.5 g. (18.5 g. theoretical). The purity of the m-thiocresol recovered was confirmed by gas chromatographic analysis.

It will be apparent that various combinations of thiocresols and their acylated esters, preferably their acetate esters, may be separated in accordance with the process of this invention. The initial mixture to be separated may consist of only the thiocresols per se, or only their esters, or mixtures thereof. Further, the specific process of this invention may be varied by utilizing known techniques of esterification and hydrolysis. However, these modifications with respect to esterification and hydrolysis are considered variants of the process of this invention, which is directed to separating hitherto unseparable mixtures of thiocresols by first esterifying them prior to attempting a distillate separation. The scope of this invention should accordingly be determined in accordance with the objects and claims thereof.

The embodiments of the invention in which an exclusive property or privilege is claimed are defined as follows:

1. In a process for refining a mixture containing at least one component selected from the group consisting of orthothiocresol and a lower aliphatic monocarboxylic acid ester thereof and at least one other component selected from the group consisting of meta- and parathiocresols and their respective lower aliphatic monocarboxylic acid esters, at least a thiocresol isomer being present, the steps of reacting the mixture with an acylating agent to convert at least a portion of thiocresols present to lower aliphatic monocarboxylic acid esters thereof and fractionally distilling the mixture to separately recover at least the lower aliphatic monocarboxylic acid ester of orthothiocresol.

2. The process according to claim 1 wherein said acylating agent is acetic anhydride.

3. The process according to claim 1 including the additional step of hydrolyzing at least the lower aliphatic monocarboxylic acid ester of orthothiocresol to form at least orthothiocresol.

4. A process for refining mixed thiocresols containing orthothiocresol and at least one thiocresol selected from the group consisting of meta- and parathiocresols, which comprises reacting said mixed thiocresols with the anhydride of a lower aliphatic monocarboxylic acid to convert thiocresols present to their respective lower aliphatic monocarboxylic acid esters, fractionally distilling the mixture to separately recover the lower aliphatic monocarboxylic acid ester of orthothiocresol and at least one other ester selected from the group consisting of the lower aliphatic monocarboxylic acid esters of meta- and parathiocresols, and separately hydrolyzing the lower aliphatic monocarboxylic acid ester of orthothiocresol and at least an ester selected from the group consisting of the lower aliphatic monocarboxylic acid esters of meta- and parathiocresols to form the respective thiocresol isomers.

5. The process according to claim 4 wherein said anhydride is acetic anhydride.

6. A process for separately recovering a lower aliphatic monocarboxylic acid ester of orthothiocresol from a mixture containing at least one other ester selected from the group consisting of the lower aliphatic monocarboxylic acid esters of meta- and parathiocresols, which comprises fractionally distilling the mixture using at least 20 theoretical plates to separately recover the lower aliphatic monocarboxylic acid ester of orthothiocresol as lower boiling component and at least one other ester selected from the group consisting of the lower aliphatic monocarboxylic acid ester of meta- and parathiocresols as higher boiling component.

7. The process according to claim 6 wherein said esters are the acetates.

8. The process according to claim 6 including the additional subsequent steps of separately hydrolyzing the lower aliphatic monocarboxylic acid ester of orthothiocresol to form orthothiocresol and hydrolyzing at least one ester selected from the group consisting of the lower aliphatic monocarboxylic acid esters of meta- and parathiocresols to form the respective thiocresol isomer.

9. A process for recovering orthothiocresol from a mixture consisting essentially of ortho-, meta- and parathiocresols which comprises the steps in sequence of acetylating said mixture with acetic anhydride to convert ortho-, meta-, and parathiocresol isomers to the acetates thereof, fractionally distilling the acetylated reaction mixture to separately recover a lower boiling fraction consisting of the acetate of orthothiocresol and a higher boiler fraction consisting of a mixture of the acetates of meta- and parathiocresols, and separately hydrolyzing the acetate of orthothiocresol to form o-thiocresol.

10. A process for separating individual ortho- and metathiocresol isomers from a mixture consisting essentially of their acetates which comprises the steps in sequence of fractionally distilling said reaction mixture to separately recover the acetate of o-thiocresol as lower boiling fraction and the acetate of m-thiocresol as higher boiling fraction, and separately hydrolyzing at least one of said recovered acetates to form the respective thiocresol isomer.

11. A process for separating individual ortho- and parathiocresol isomers from a mixture consisting essentially of their acetates which comprises the steps in sequence of fractionally distilling said reaction mixture to separately recover the acetate of o-thiocresol as lower boiling fraction and the acetate of p-thiocresol as higher boiling fraction, and separately hydrolyzing at least one of said recovered acetates to form the respective thiocresol isomer.

References Cited by the Examiner
UNITED STATES PATENTS 2,804,480   8/1957   Martin _____ 260—479

CHARLES B. PARKER, *Primary Examiner.*

DANIEL D. HORWITZ, DELBERT R. PHILLIPS,
*Assistant Examiners.*